Nov. 7, 1939.  LE ROY BAHENSKY  2,179,170
TRACTOR WHEEL ATTACHMENT
Filed April 6, 1938   2 Sheets-Sheet 1
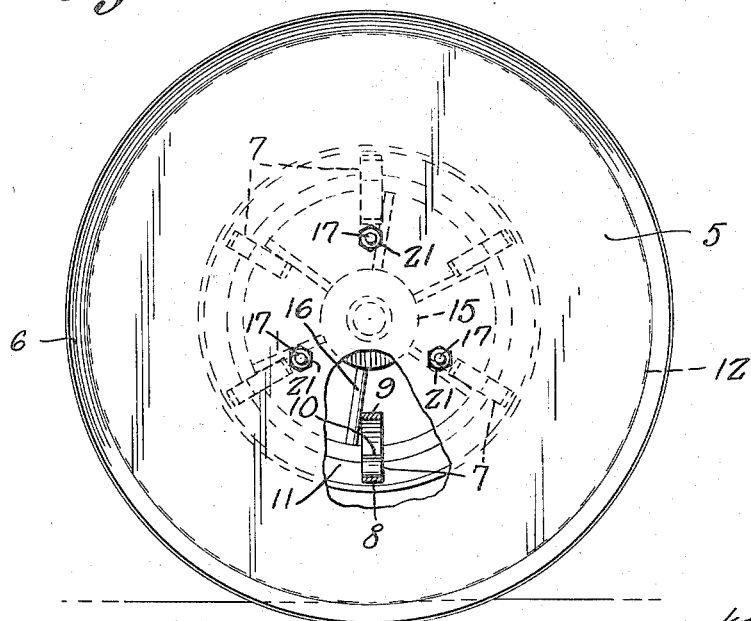
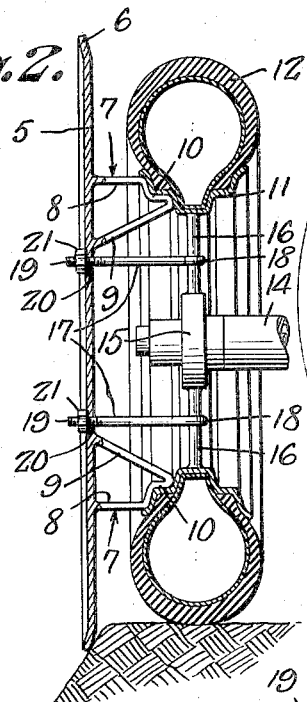
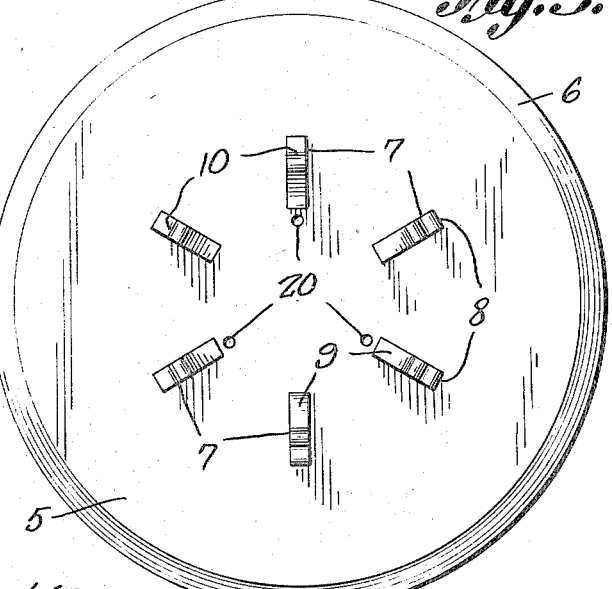

Nov. 7, 1939.   LE ROY BAHENSKY   2,179,170
TRACTOR WHEEL ATTACHMENT
Filed April 6, 1938   2 Sheets-Sheet 2

LeRoy Bahensky, INVENTOR
BY Victor J. Evans & Co.
ATTORNEYS

Patented Nov. 7, 1939

2,179,170

UNITED STATES PATENT OFFICE 2,179,170

TRACTOR WHEEL ATTACHMENT

Le Roy Bahensky, Palmer, Nebr.

Application April 6, 1938, Serial No. 200,545

2 Claims. (Cl. 301—38)

My invention relates to tractor wheel attachments and more particularly to that class of attachments for causing the wheels to follow a corn ridge where listed corn is planted.

At present, many tractors are equipped with pneumatic or solid tires and extreme difficulty is experienced in causing the wheels to follow on the ridges. It is highly desirable that the wheels follow the ridges, especially in the instances where listed corn is planted in deep furrows, because the action of the wheels in slipping off the ridges into the furrow causes damage to the corn planted therein. Therefore, it is one of the principal objects of my invention to provide means attachable to a tractor wheel for maintaining said wheel on the ridge formed by a furrow in which listed corn or the like is planted.

Another object of my invention is to provide means for ready attachment to the wheels of tractors to support the wheels on furrows which is simple in operation and economical in manufacture.

Other objects and advantages will be apparent from the following description, appended claims and annexed drawings.

Referring to the drawings wherein like reference characters designate like parts throughout the several views:

Figure 1 is a side elevation of my invention.

Figure 2 is a transverse sectional view thereof illustrating the same connected to the wheel of a tractor.

Figure 3 is a rear elevation of my invention.

Figure 4 is a detail perspective view of one of the hook bolts or fastening devices.

Figure 5:
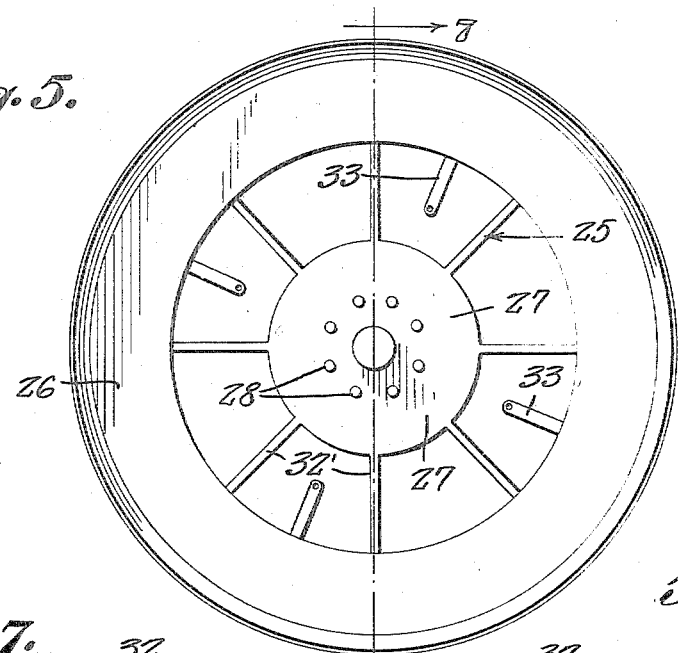
Figure 5 is a side elevation of a modified form of my invention.

My invention comprises, in the preferred embodiment illustrated in Figures 1 to 4 of the drawings inclusive, a disk 5 flared circumferentially to form an offset flange section 6 for engagement with the ridge of a furrow. Said disk has secured to the inner face thereof a plurality of spacing members 7 spaced therefrom. The spacing members constitute brackets having outer sections 8 right angularly disposed relative to the inner face of the disk and inner sections 9 extending from said inner face towards the outer end of the sections 8 and effecting jointure therewith to form rim embracing sections 10 adapted to engage the inner periphery and side face of a tire rim 11 in which is mounted a tire 12 of a tractor wheel 13 rotatably mounted on the tractor axle 14 through the medium of a hub 15 having spokes 16 connecting said hub to said rim.

Fastening devices or bolt hooks 17 are fashioned with hooked ends 18 embracing the spokes 16 and with threaded ends 19 extending through apertures 20 in the disk 5 for receiving nuts 21 whereby the rim is secured to the tractor wheel. The spacing members 7 serve to position the rim in lateral and vertical positions relative to the tire 12 and the fastening devices 17 serve to secure said rim in said spaced position. The lower sections 9 of the spacing members coact to brace the disk in relation to the wheel. The outside diameter of the disk is greater than the outside diameter of the tire 12 and the flange 6 is of a convex configuration adapted to ride the sides of a ridge, thus causing the wheel to follow on the ridge and prevent the wheel from slipping into the furrow as illustrated in Figures 1 and 2 of the drawings.

Figure 7:
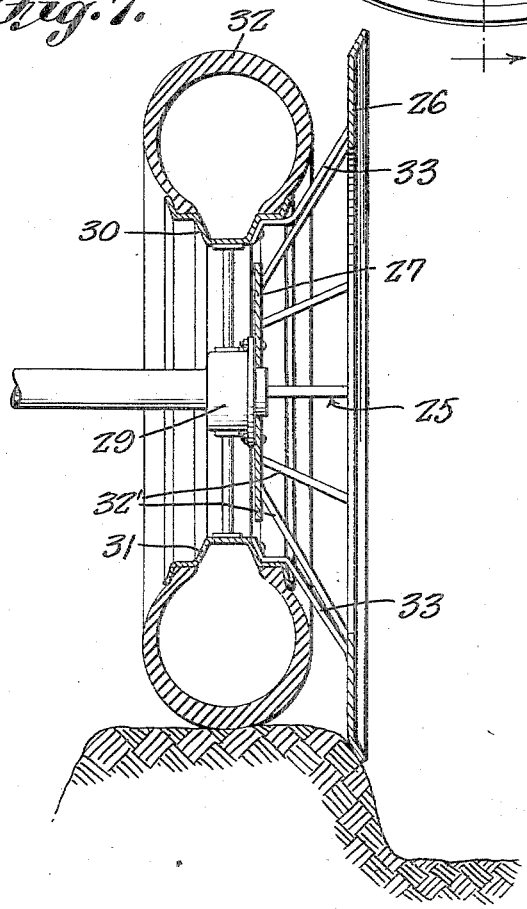
Figure 7 is a sectional view taken on the line 7—7 of Figure 5 and showing my device connected to the wheel of a tractor.
Figure 6:
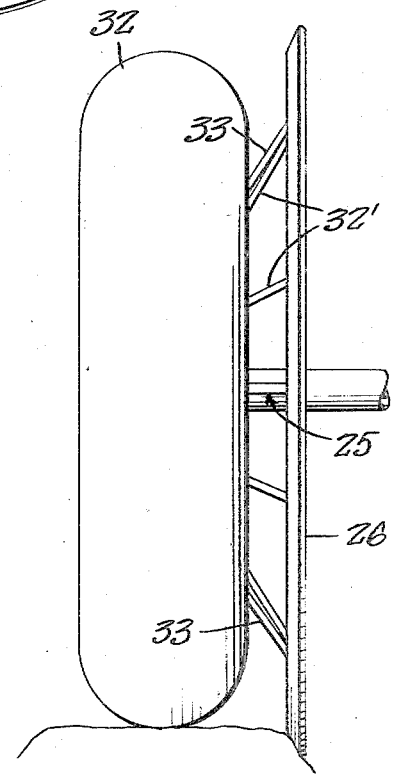
Figure 6 is a front elevation of the modified form illustrated in connection with the wheel of a tractor.

In the modified form of my invention illustrated in Figures 5 to 7 inclusive of the drawings a spider 25 has connected thereto a circumferential member 26 and is fashioned with a hub 27 having suitable bolt holes 28 for the reception of bolts for securing the hub 27 to the hub 29 of a tractor wheel 30 or the like. The tractor wheel is provided with a rim 31 and a pneumatic tire 32 secured thereon. The spokes 32' forming the spider 25, as illustrated in Figure 7 of the drawings, extend outwardly and are inclined towards the outer periphery of the circumferential member 26 to position the circumferential member in spaced relation laterally of the wheel 30.

A plurality of similar inclined and outwardly extending braces 33, secured to the circumferential member, are connected to the rim 31 by suitable bolts and serve to brace the circumferential member in relation to the wheel. The outside diameter of the circumferential member is greater than the outside diameter of the tire 32. The outer periphery of the circumferential member or rim is convex and adapted to ride the sides of a ridge, as in the instance of the preferred form.

It will be apparent, from the foregoing, that my invention lends itself to ready attachment to the wheels of tractors and effectively prevents the wheels from slipping off the ridges.

What I claim is:

1. In combination with a spoked tractor wheel having a rim, a disk fashioned with axially inwardly extending spacing members engaging the rim of said tractor wheel and effecting spacing of said disk therefrom in braced condition, and fastening devices connecting said disk to the spokes of said wheel, said disk of a larger diameter than the outside diameter of said wheel to maintain said wheel on a ridge by engagement of the disk with the side of said ridge.

2. In combination with a spoked tractor wheel having a rim, a disk having laterally extending spacing members engaging said rim for spacing said rim therefrom, and bolts connecting said disk to the spokes of said wheel and coacting with said spacing members for maintaining said disk in braced condition relative to said wheel, said disk of a larger diameter than the outside diameter of said wheel to maintain said wheel on a ridge by engagement of the disk with the side of said ridge.

LE ROY BAHENSKY.